US012675224B2

(12) United States Patent
Papagianni et al.

(10) Patent No.: US 12,675,224 B2
(45) Date of Patent: Jul. 7, 2026

(54) PARTIAL BLOCKS WORD LINE READ OFFSETS

(71) Applicant: Micron Technology, Inc., Boise, ID (US)

(72) Inventors: Christina Papagianni, San Jose, CA (US); Murong Lang, San Jose, CA (US); Guang Hu, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/789,791

(22) Filed: Jul. 31, 2024

(65) Prior Publication Data

US 2026/0037142 A1     Feb. 5, 2026

(51) Int. Cl.
G06F 12/00       (2006.01)
G06F 3/06        (2006.01)
(52) U.S. Cl.
CPC .......... G06F 3/0619 (2013.01); G06F 3/0659 (2013.01); G06F 3/0679 (2013.01)

(58) Field of Classification Search
None
See application file for complete search history.

(56) References Cited

U.S. PATENT DOCUMENTS

| | | | |
|---|---|---|---|
| 2022/0334752 A1* | 10/2022 | Muchherla | ............ G06F 3/0655 |
| 2023/0393991 A1* | 12/2023 | Chang | ................. G11C 29/028 |
| 2024/0427500 A1* | 12/2024 | Ciocchini | ............ G06F 3/0679 |

* cited by examiner

*Primary Examiner* — Daniel D Tsui
(74) *Attorney, Agent, or Firm* — Schwegman Lundberg & Woessner, P.A.

(57)                ABSTRACT
A memory sub-system controller selectively adjusts read threshold voltages on certain word lines for partially written memory blocks of a memory sub-system. The controller generates a request to read a portion of a set of memory components. The controller, in response to determining that the portion corresponds to a partially programmed block (PB), selectively modifies a boundary word line (WL) read level offset, stored in a boundary WL offset table, by applying an adjustment factor to the boundary WL read level offset. The controller reads a first set of data from one or more inner WLs of the portion using a first read level offset retrieved from an inner WL offset table and reads a second set of data from a boundary WL of the portion using the selectively modified boundary WL read level offset.

20 Claims, 6 Drawing Sheets

300

| gwl D2S POR | type | Data WL | sub0 | sub1 | sub2 | sub3 |
|---|---|---|---|---|---|---|
| | sgd4 | - | - | - | - | - |
| | sgd3 | - | - | - | - | - |
| | sgd2 | - | - | - | - | - |
| | sgd1 | - | - | - | - | - |
| | sgd0 | - | - | - | - | - |
| 0 | d_up0 | - | Dummy | Dummy | Dummy | Dummy |
| 1 | d_up1 | - | Dummy | Dummy | Dummy | Dummy |
| 2 | d_up2 | - | Dummy | Dummy | Dummy | Dummy |
| 3 | main_wl0 | 0 | 0 | 1 | 2 | 3 |
| 4 | main_wl1 | 1 | 4 | 5 | 6 | 7 |
| 5 | main_wl2 | 2 | 8 | 9 | 10 | 11 |
| 6 | main_wl3 | 3 | 12 | 13 | 14 | 15 |
| 7 | main_wl4 | 4 | 16 | 17 | 18 | 19 |
| 8 | main_wl5 | 5 | 20 | 21 | 22 | 23 |
| 9 | main_wl6 | 6 | 24 | 25 | 26 | 27 |
| 10 | main_wl7 | 7 | 28 | 29 | 30 | 31 |
| 11 | main_wl8 | 8 | 32 | 33 | 34 | 35 |
| 12 | main_wl9 | 9 | 36 | 37 | 38 | 39 |

310

320

Programmed pages

Programmed but
Last written page (LWP) info
not Updated to FTL

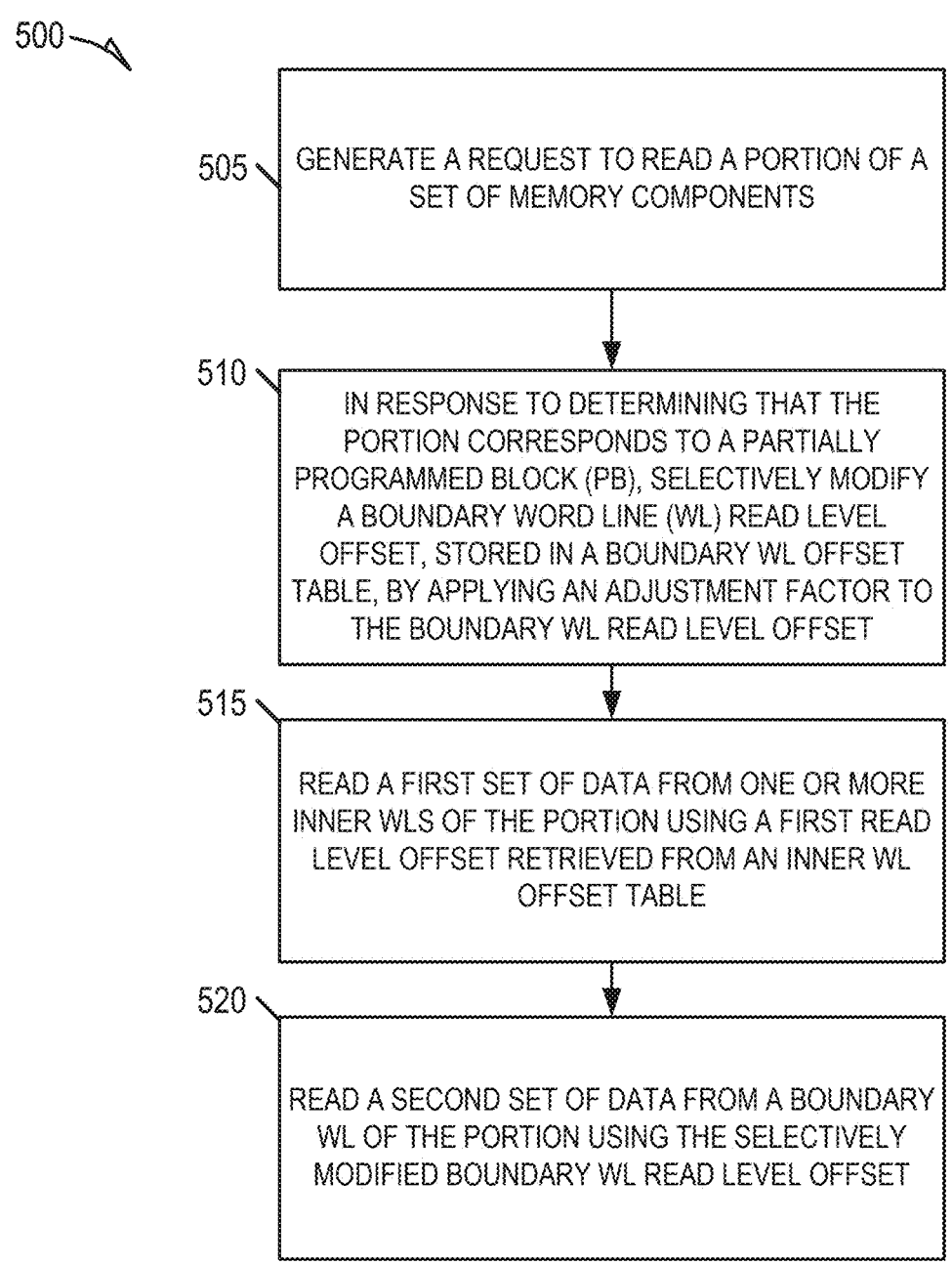

500

505 — GENERATE A REQUEST TO READ A PORTION OF A SET OF MEMORY COMPONENTS

510 — IN RESPONSE TO DETERMINING THAT THE PORTION CORRESPONDS TO A PARTIALLY PROGRAMMED BLOCK (PB), SELECTIVELY MODIFY A BOUNDARY WORD LINE (WL) READ LEVEL OFFSET, STORED IN A BOUNDARY WL OFFSET TABLE, BY APPLYING AN ADJUSTMENT FACTOR TO THE BOUNDARY WL READ LEVEL OFFSET

515 — READ A FIRST SET OF DATA FROM ONE OR MORE INNER WLS OF THE PORTION USING A FIRST READ LEVEL OFFSET RETRIEVED FROM AN INNER WL OFFSET TABLE

520 — READ A SECOND SET OF DATA FROM A BOUNDARY WL OF THE PORTION USING THE SELECTIVELY MODIFIED BOUNDARY WL READ LEVEL OFFSET

*FIG. 5*

PARTIAL BLOCKS WORD LINE READ OFFSETS

TECHNICAL FIELD

This disclosure relates generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

FIG. 5 is a flow diagram of an example method to selectively adjust a boundary WL read level offset, in accordance with some examples.

DETAILED DESCRIPTION

Figure 1:
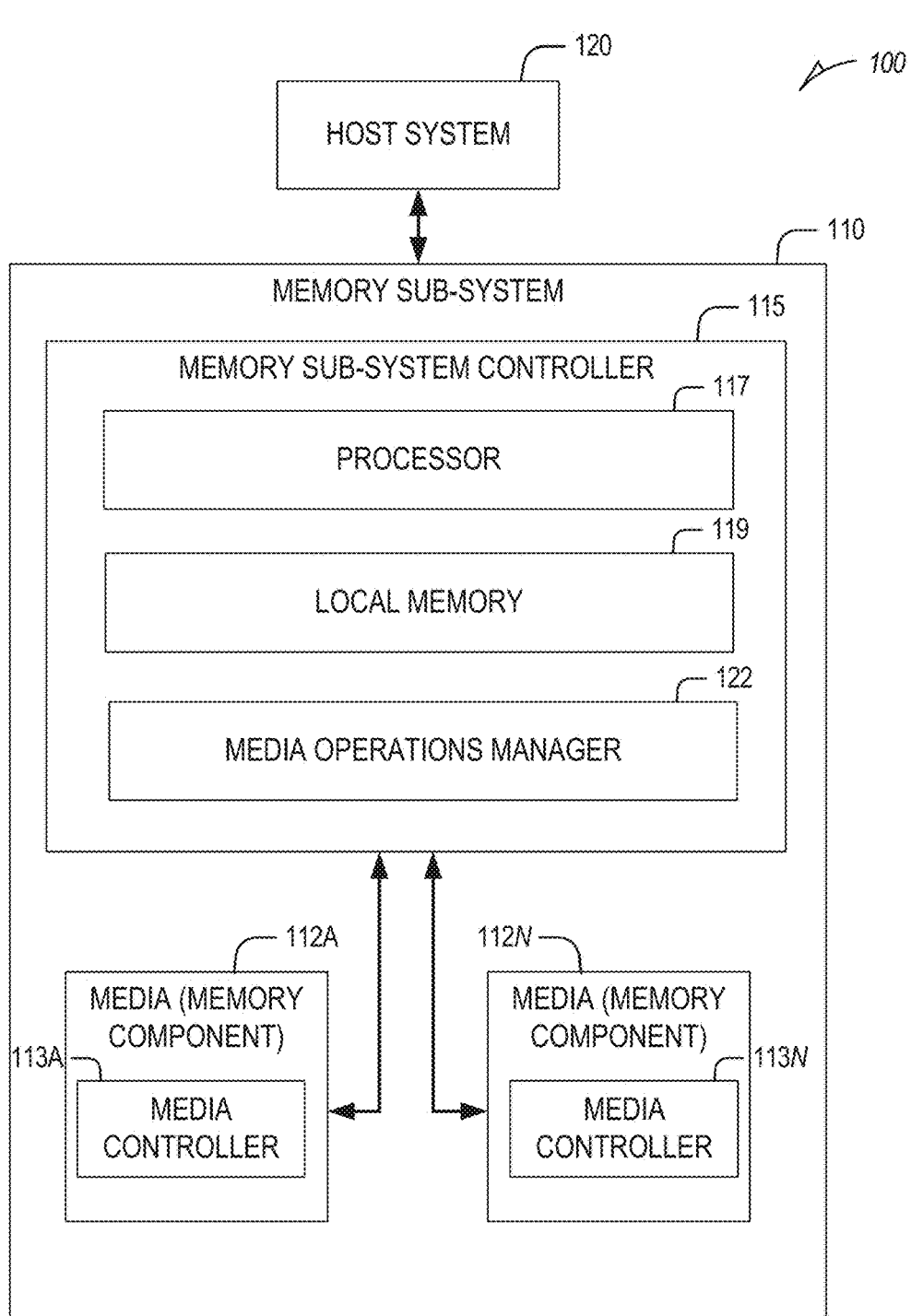
FIG. 1 is a block diagram illustrating an example computing environment including a memory sub-system, in accordance with some examples.

The present disclosure configures a system component, such as a memory sub-system controller, to perform selective adjustments to a boundary WL read level offset based on various conditions. Specifically, when the controller reads a region (e.g., a WL) of a set of memory components that is indicated to include a last programmed portion (e.g., last programmed page), the controller can retrieve a boundary WL read level offset. The boundary WL read level offset can be used to adjust a read threshold voltage that is applied to read data from the region. The controller can obtain an adjustment factor and can modify the boundary WL read level offset by the adjustment factor to reduce a read bit error rate (RBER) associated with reading data from the last programmed portion. This ensures that performance of the memory system remains optimal and improves the overall efficiency of operating the memory sub-system.

A memory sub-system can be a storage device, a memory module, or a hybrid of a storage device and memory module.

Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data".

The memory sub-system can initiate media management operations, such as a write operation, on host data that is stored on a memory device. In some examples, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction code (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area that can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, certain memory devices, such as NAND flash devices, store data in different WLs. The memory devices can program data into different blocks.

Memory blocks that are fully programmed and are closed are referred to as full blocks (FBs). Memory blocks that are not fully programmed (e.g., are still open and have one or more sub-blocks that remain empty and ready to be programmed) are referred to as partially programmed blocks (PBs). In order to reduce read disturb errors and other extrinsic defect related errors when reading data, the controllers can apply offsets to the read threshold voltages used to read data from FBs and PBs. Specifically, when reading data from PBs, the controllers can either apply inner WL offsets or boundary WL offsets depending on whether the WL being read includes a last programmed page or not.

In some cases, the controllers keep track of which regions of the memory components were last programmed. Namely, the controllers can store an indicator of the location of the last page that was programmed to the set of memory components. The WL that includes the last page that was programmed can be referred to as a boundary WL. All other WLs that do not include the last page can be referred to as inner WLs. To reduce RBER when reading data from the boundary WL, the controllers combine the read level offset of the inner WL with the read level offset of the boundary WL and modify the read threshold voltage by the combined read level offsets. While this approach generally works well to reduce the RBER, there are instances where the controllers improperly track the components that include the last written portion. Namely, the controllers may encounter a delay in updating what region of the set of memory components currently store the last programmed page. This can result in the controllers improperly applying the combined offset (e.g., the combined inner WL offset and the boundary WL offset) to read data from a WL that does not actually include the last programmed portion. For example, the controllers can obtain stale information indicating that a portion was last programmed to a particular region that is being read where in reality the portion that was last programmed is in a different region. Reading data from the particular region using the combined offset can result in a large RBER. This can cause the controller to perform various error correction operations or fail to properly read the data which reduces the performance and efficiencies of the memory sub-system.

The present disclosure addresses the above and other deficiencies by providing a memory controller that can selectively and intelligently perform adjustments to a boundary WL read level offset based on various conditions. Specifically, when the controller reads a region (e.g., a WL) of a set of memory components that is indicated to include a last programmed portion (e.g., last programmed page) (regardless of whether this indication is correct or not), the controller can retrieve a boundary WL read level offset. The boundary WL read level offset can be used to adjust a read threshold voltage that is applied to read data from the region. The controller can obtain an adjustment factor and can modify the boundary WL read level offset by the adjustment factor to reduce the RBER associated with reading data from the last programmed portion. Namely, by applying the adjustment factor, such as to reduce the boundary WL read level offset that is retrieved, the amount by which the read threshold voltage is modified can be reduced. This can improve the RBER associated with data read from the region (e.g., the WL). This ensures that performance of the memory system remains optimal and improves the overall efficiency of operating the memory sub-system.

In some examples, the memory controller generates a request to read a portion of the set of memory components. The memory controller, in response to determining that the portion corresponds to a PB, selectively modifies a boundary WL read level offset, stored in a boundary WL offset table, by applying an adjustment factor to the boundary WL read level offset. The memory controller reads a first set of data from one or more inner WLs of the portion using a first read level offset retrieved from an inner WL offset table and reads a second set of data from a boundary WL of the portion using the selectively modified boundary WL read level offset.

The memory controller can store the inner WL offset table and the boundary WL offset table. The boundary WL offset table can represent a set of read level offsets for reading data from an individual WL of a PB including a last programmed set of data. In some cases, the memory controller obtains the boundary WL read level offset from the boundary WL offset table. The memory controller modifies the boundary WL read level offset by the adjustment factor and combines the modified boundary WL read level offset with the first read level offset to generate a second read level offset.

The memory controller can read the second set of data using the second read level offset. The memory controller can add the first read level offset and the modified boundary WL read level offset to generate the second read level offset. In some cases, the memory controller retrieves a read threshold voltage for reading data from the portion. The memory controller modifies the read threshold voltage by the first read level offset to read the first set of data and modifies the read threshold voltage by the second read level offset to read the second set of data.

The inner WL offset table can associate a first WL group (WLG) with a first set of read level offsets corresponding to different levels of tri-level cell (TLC) storage. The inner WL offset table associates a second WLG with a second set of read level offsets corresponding to the different levels of the TLC storage. The boundary WL offset table associates the first WLG with a third set of read level offsets corresponding to the different levels of the TLC storage and the boundary WL offset table associates the second WLG with a fourth set of read level offsets corresponding to the different levels of the TLC storage.

In some examples, the memory controller maintains a buffer that identifies which region of the set of memory components has been programmed last. The memory controller determines that the portion includes the region of the set of memory components that has been programmed last and determines that the portion corresponds to the PB in response to determining that the portion includes the region of the set of memory components that has been programmed last. In some cases, the memory controller determines that the boundary WL of the portion corresponds to the region of the set of memory components maintained in the buffer. The memory controller, in response to determining that the boundary WL of the portion corresponds to the region of the set of memory components maintained in the buffer, reads the second set of data from the boundary WL of the portion using the selectively modified boundary WL read level offset.

An additional set of data may have been programmed more recently than the second set of data prior to the buffer being updated to identify an individual region including the additional set of data. The second set of data can be read from the boundary WL of the portion using the selectively modified boundary WL read level offset in response to the additional set of data being programmed prior to the buffer being updated to identify the individual region including the additional set of data. In some cases, the adjustment factor includes a value of at least one of one third, two thirds, one half, or three quarters.

In some examples, the memory controller stores a plurality of adjustment factors each associated with a different set of conditions and selects the adjustment factor from the plurality of adjustment factors based on a current condition of the set of memory components. The memory controller determines that a program erase count (PEC) associated with the set of memory components corresponds to a beginning of life (BOL) period. The memory controller, in response to determining that the PEC associated with the set of memory components corresponds to the BOL period, selects a first adjustment factor from the plurality of adjustment factors, the first adjustment factor being associated with a BOL condition in the set of conditions.

In some cases, the memory controller determines that the PEC associated with the set of memory components corresponds to a middle of life (MOL) period. The memory controller, in response to determining that the PEC associated with the set of memory components corresponds to the MOL period, selects a second adjustment factor from the plurality of adjustment factors, the second adjustment factor being associated with a MOL condition in the set of conditions. In some cases, the memory controller determines that the PEC associated with the set of memory components corresponds to an end of life (EOL) period. The memory controller, in response to determining that the PEC associated with the set of memory components corresponds to the EOL period, selects a third adjustment factor from the plurality of adjustment factors, the third adjustment factor being associated with an EOL condition in the set of conditions.

In some examples, the memory controller measures slow charge loss (SCL) associated with the portion of the set of memory components. The memory controller, in response to determining that the SCL associated with the portion of the set of memory components fails to transgress a threshold value, selects a first adjustment factor from the plurality of adjustment factors, the first adjustment factor being associated with a first SCL condition in the set of conditions. The memory controller, in response to determining that the SCL associated with the portion of the set of memory components transgresses the threshold value, selects a second adjustment factor from the plurality of adjustment factors, the second adjustment factor being associated with a second SCL condition in the set of conditions.

The memory controller can measure temperature associated with the set of memory components. The memory controller can select a first adjustment factor from the plurality of adjustment factors based on the measured temperature. The first adjustment factor can be associated with a first temperature condition in the set of conditions including a first range of temperatures. A second adjustment factor can be associated with a second temperature condition in the set of conditions including a second range of temperatures and a third adjustment factor can be associated with a third temperature condition in the set of conditions including a third range of temperatures.

Though various examples are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed.

In some examples, the first memory component 112A, including one or more portions (e.g., one or more WLs, one or more WLGs, one or more blocks, one or more memory dies, and/or one or more pages) or group of memory components including the first memory component 112A, can be associated with a first reliability (capability) grade, value, measure, or lifetime PEC. The terms "reliability grade," "value" and "measure" are used interchangeably throughout and can have the same meaning. The second memory component 112N (e.g., one or more WLs, one or more WLGs, one or more blocks, one or more memory dies, and/or one or more pages) or group of memory components, including the second memory component 112N, can be associated with a second reliability (capability) grade, value, measure, or lifetime PEC. In some examples, each memory component 112A to 112N can store respective configuration data that specifies the respective reliability grade and lifetime PEC and current PEC. In some examples, a memory or register can be associated with all of the memory components 112A to 112N and can store a table that maps different groups, portions, bins or sets of the memory components 112A to 112N to respective reliability grades, lifetime PEC values, and/or current PEC values.

In some examples, a memory or register can be associated with all of the memory components 112A to 112N and can store a table or map that maps different WL, WLGs, SBs, memory dies, and/or portions of the memory components 112A to 112N to reliability values that transgress a threshold. Namely, the memory or register can store a map that lists each WL, WLG, and/or SB that has been determined during manufacture to be defective (e.g., have a reliability value that fails to transgress a reliability threshold). In some cases, the table or map can be generated based on a distribution of errors or defects associated with a certain wafer, die sort, lot, or batch. A determination can be made that a memory sub-system 110 is part of a particular wafer, die sort, lot or batch and can then be loaded with the configuration data that includes the table or map associated with another memory sub-system 110 that is part of the same wafer, die sort, lot, or batch. In some cases, the list of portions that are in the table are referred to as mandatory WLs or mandatory portions (e.g., predetermined portions of the set of memory components 112A to 112N). These mandatory portions can be included in an extrinsic defect scan operation (e.g., a read disturb scan operation) to condition performing refresh operations if the RBER of the data read from the portions transgresses a maximum or predefined RBER threshold.

Figure 2:
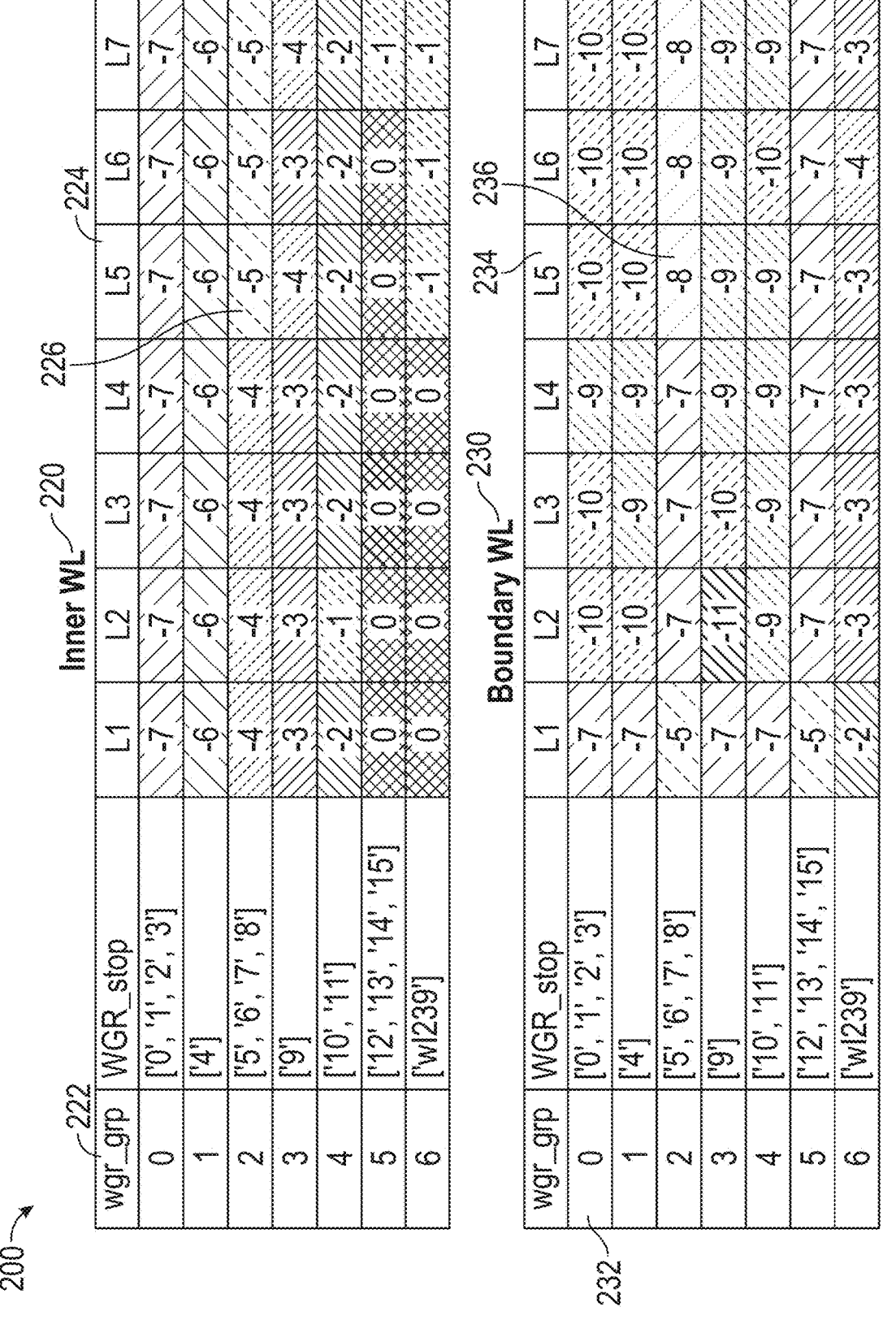
FIG. 2 is a block diagram of example inner and boundary word line (WL) read level offset tables, in accordance with some examples.

In some cases, the memory or register (e.g., included as part of the local memory 119) can store an inner WL offset table and/or a boundary WL offset table. For example, as shown in diagram 200 of FIG. 2, the inner WL offset table 220 can store various read level offsets that can be applied to a read threshold voltage when reading one or more inner WLs. Namely, a first WL or WLG 222 can be associated with a first set of read level offsets 224. Each read level offset in the first set of read level offsets 224 can represent a different amount of offset to apply to the read threshold voltage when reading different levels of TLC storage. Namely, when reading level 1 from the TLC storage in a first WLG (e.g., word line group 4), a −2 DAC offset can be applied, when reading level 2 from the TLC storage in the first WLG, a −1 DAC offset can be applied, and when reading levels 3-7 from the TLC storage in the first WLG, a −2 DAC offset can be applied.

A second WL or WLG 222 can be associated with a second set of read level offsets 224. Each read level offset in the second set of read level offsets 224 can represent a different amount of offset to apply to the read threshold voltage when reading different levels of TLC storage. Namely, when reading levels 1-4 from the TLC storage in the second WLG (e.g., word line group 6), and when reading levels 5-7 from the TLC storage in the second WLG, a −1 DAC offset can be applied.

The boundary WL offset table 230 can store various read level offsets that can be applied to a read threshold voltage when reading one or more boundary WLs (e.g., WLs that include a last programmed portion or page). Namely, the first WL or WLG 232 can be associated with a second set of read level offsets 234. Each read level offset in the third set of read level offsets 234 can represent a different amount of offset to apply to the read threshold voltage when reading different levels of TLC storage. These offsets can be the same or different from those mentioned with respect to the inner WL offset table 220. For example, the read level offset 226 in the inner WL offset table 220 for a particular WL and for a particular level of the TLC storage can be a first value of −5 DAC. The read level offset 236 in the boundary WL offset table 230 for the same particular WL and for the same particular level of the TLC storage can be a second value of −8 DAC.

In some cases, the media operations manager 122 determines that the request to read the portion of the set of memory components 112A to 112N corresponds to a PB. In such cases, the media operations manager 122 can access a buffer or storage to identify which WL is indicated to store the last programmed portion or page. The media operations manager 122 can determine a level of the TLC storage that is being read and retrieves the read level offset stored in the inner WL offset table 220. The media operations manager 122 obtains a read threshold voltage for reading data from the portion and modifies the read threshold voltage by the read level offset retrieved from the inner WL offset table 220. The media operations manager 122 can then read each inner WL of the PB using the same modified read threshold voltage. Namely, the media operations manager 122 can read each WL of the PB excluding the identified WL that includes the last programmed portion or page using the read threshold voltage that has been modified by the corresponding value in the inner WL offset table 220.

The media operations manager 122 can obtain the read level offset stored in the boundary WL offset table 230 for the read level being read from the identified WL that includes the last programmed portion or page. The media operations manager 122 can combine (e.g., add) the read level offset stored in the boundary WL offset table 230 with the read level offset that was used to read the inner WL to generate a second read level offset. In some cases, a table (a separate table) can be maintained that includes the already combined values so that the media operations manager 122 does not have to combine the read level offset stored in the boundary WL offset table 230 with the read level offset that was used to read the inner WL to generate the second read level offset (e.g., the second read level offset can be pre-computed and stored in a table). The media operations manager 122 can then read the identified WL of the PB that includes the last programmed portion or page using the read threshold voltage adjusted by the second read level offset. In some cases, the media operations manager 122 can determine one or more conditions (e.g., program-erase count, temperature, SCL, and so forth) of the memory sub-system 110 and/or the set of components 112A to 112N of the memory sub-system 110. The media operations manager 122 can select an adjustment factor based on the one or more conditions. The adjustment factor can be a value that is one quarter (0.25), one third (⅓), two thirds (⅔), one half (0.5), or three quarter (0.75). The adjustment factor can be applied to the read level offset stored in the boundary WL offset table 230 prior to combining that value with the read level offset used to read the inner WL. This can, in some cases, reduce the read threshold voltage used to read the boundary WL which can reduce the RBER. In this case, whether or not the boundary WL does or does not actually contain the last programmed portion, reducing the read threshold voltage based on the adjustment factor can reduce or improve the RBER.

Referring back to FIG. 1, in some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe)

interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory and/or a 3D NAND flash memory. Each of the memory components 112A to 112N can include one or more arrays of memory cells such as single-level cells (SLCs) or multi-level cells (MLCs) (e.g., TLCs or QLCs). In some examples, a particular memory component 112A can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), resistive random access memory (RRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112A used to store data. For example, a single first row that spans a first set of the pages or blocks of the memory components 112A to 112N can correspond to or be grouped as a first block stripe and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, garbage collection operations, different near miss ECC operations, read disturb scan operations, and/or different dynamic data refresh operations.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the lifetime PEC values and/or reliability grades associated with different groups of the memory components 112N to 112N and/or different WLs, WLGs, and/or blocks within each of the memory components 112N to 112N. The configuration data can include a table that lists WLs, WLGs, and/or sub-blocks (SBs) that are known to be defective or susceptible to stress to be included as part of the mandatory WLs, WLGs, and/or SBs to include in an RDCL scan or other extrinsic defect scan operation.

The memory sub-system controller 115 can be responsible for other memory management operations, such as wear leveling operations, garbage collection operations, error detection and error-correcting code (ECC) operations, encryption operations, caching operations, read scan, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can selectively and intelligently perform adjustments to a boundary WL read level offset based on various conditions. Specifically, when the media operations manager 122 reads a region (e.g., a WL) of a set of memory components 112A to 112N that is indicated to include a last programmed portion (e.g., last programmed page) (regardless of whether this indication is correct or not), the media operations manager 122 can retrieve a boundary WL read level offset. The boundary WL read level offset can be used to adjust a read threshold voltage that is applied to read data from the region. The media operations manager 122 can obtain an adjustment factor and can modify the boundary WL read level offset by the adjustment factor to reduce the RBER associated with reading data from the last programmed portion. Namely, by applying the adjustment factor, such as to reduce the boundary WL read level offset that is retrieved, the amount by which the read threshold voltage is modified can be reduced. This can improve the RBER associated with data read from the region (e.g., the WL). This ensures that performance of the memory sub-system 110 remains optimal and improves the overall efficiency of operating the memory sub-system 110.

In some examples, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 3:
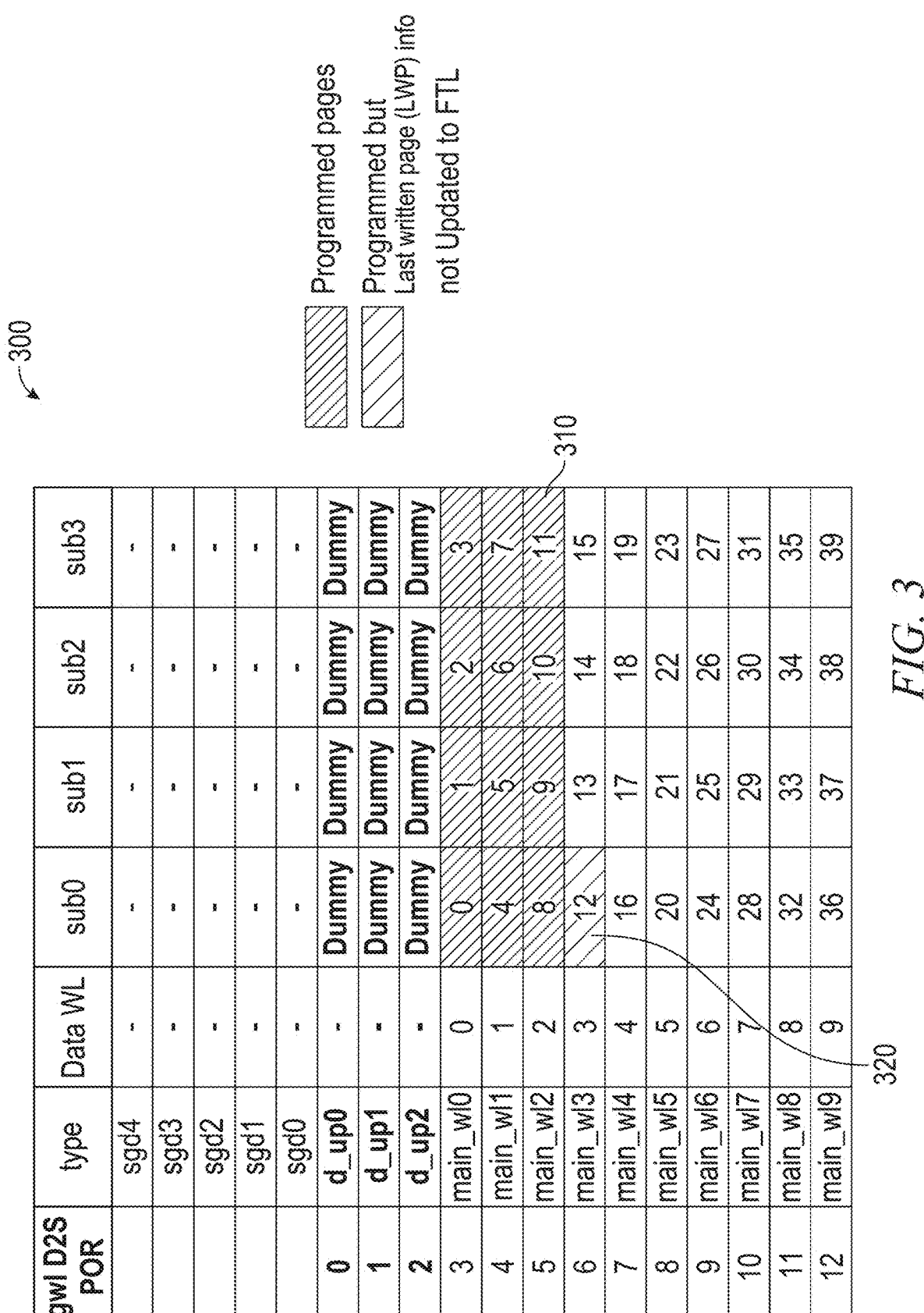
FIG. 3 is a block diagram of an example of applying an adjusted boundary WL read level offset to read data from a WL, in accordance with some examples.

Specifically, as shown in the diagram 300 of FIG. 3, the media operations manager 122 can store or program data sequentially across SBs of the set of memory components 112A to 112N. The media operations manager 122 can maintain a pointer or buffer that identifies what the last programmed portion or page is in the set of memory components 112A to 112N. Specifically, the media operations manager 122 can store a pointer indicating that the SB3 310 in WL5 is the last programmed portion or page. In such cases, when reading data from the WL5, the media operations manager 122 can determine that the WL5 is a PB that includes the last programmed portion or page based on the data stored in the buffer or pointer. The media operations manager 122 can use the read level offset stored in the boundary WL offset table 230 together with the read level offset stored in the inner WL offset table 220 to read data from the WLG0 (WL5 is in WLG0). In actuality, the pointer or buffer may incorrectly identify the SB3 310 as the last programmed portion because an additional page or portion 320 (e.g., SBO) from the next WL6 may have been programmed before the pointer or buffer was updated to indicate that the portion 320 is the last programmed portion or page. The media operations manager 122 can, in such cases, still consider WL6 to be an empty WL and apply one read level offset to read the data stored in the SB3 310 (e.g., the combined read level offset that includes the offset retrieved from the inner WL offset table 220 and the offset retrieved from the boundary WL offset table 230).

Figure 4:
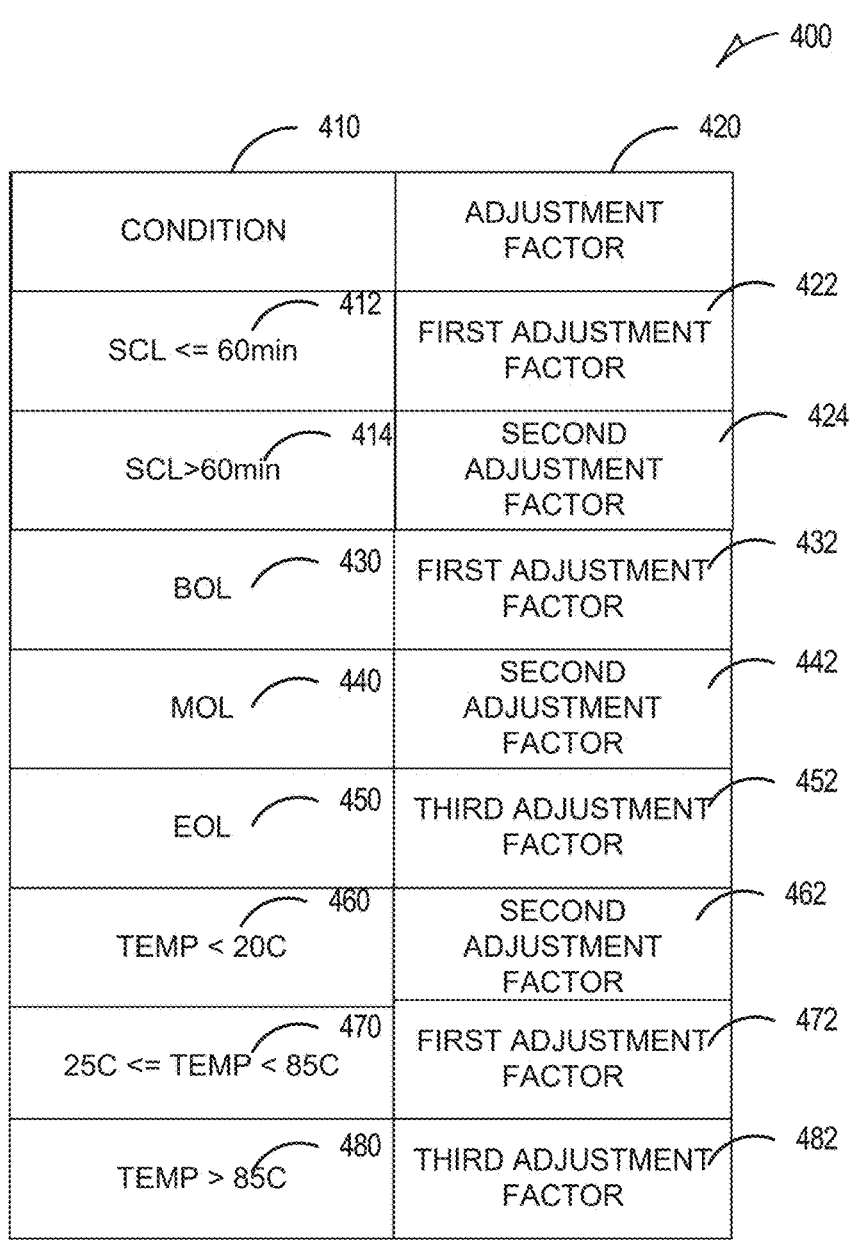
FIG. 4 is a block diagram of an example table that associates different conditions with different adjustment factors, in accordance with some examples.

In order to reduce read errors and improve the RBER, the media operations manager 122 can apply an adjustment factor to reduce the read level offset applied to read the data from the boundary WL. Namely, the media operations manager 122 can dynamically select an adjustment factor to reduce the read level offset that is used to read data from a WL that is indicated by the pointer or buffer to contain or include the last programmed portion. The media operations manager 122 can store a table 400 shown in FIG. 4, that lists various conditions 410 and respective adjustment factors 420.

In some examples, the media operations manager 122 determines a current condition of the memory sub-system 110 and/or the set of memory components 112A to 112N. The media operations manager 122 can match the current condition to one of the various conditions 410 to retrieve a corresponding adjustment factor from the respective adjustment factors 420. The media operations manager 122 can, when applying the read level offset from the boundary WL offset table 230, first modify the read level offset by the retrieved adjustment factor, such as to reduce the read threshold voltage that would otherwise be used to read the data from the boundary WL. In this way, the read threshold voltage used to read the boundary WL can be closer in value to the read threshold voltage used to read an inner WL because the boundary WL may or may not include the last programmed page. By bringing the read threshold voltage used to read the boundary WL closer to that used for reading the inner WL but not entirely the same, fewer read errors can be encountered which improves the overall efficiency of operating the memory sub-system 110.

For example, the media operations manager 122 can determine that an individual WL being read corresponds to a PB and is indicated by the buffer or pointer to include the last programmed page. In such cases, the media operations manager 122 can measure an SCL associated with data stored in the individual WL. The media operations manager 122 can determine that the measured SCL is below a threshold to determine that a first condition 412 is met. In such cases, the media operations manager 122 retrieves a first adjustment factor 422 (e.g., 25 percent or a quarter) associated with the first condition 412. The media operations manager 122 can then retrieve the read level offset stored in the boundary WL offset table 230 for the individual WL and/or for the level of the TLC being read and multiply or modify the retrieved read level offset by the first adjustment factor 422. The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

Similarly, in some cases, the media operations manager 122 can determine that the measured SCL is above the threshold to determine that a second condition 414 is met. In such cases, the media operations manager 122 retrieves a second adjustment factor 424 associated with the second condition 414. The media operations manager 122 can then retrieve the read level offset stored in the boundary WL offset table 230 for the individual WL and/or for the level of the TLC being read and multiply or modify the retrieved read level offset by the second adjustment factor 424 (e.g., 50% or half). The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

In some examples, the media operations manager 122 can compute a PEC value for a portion of the set of memory components 112A to 112N being read. The media operations manager 122 can determine that the PEC value is below a first threshold. In such cases, the media operations manager 122 determines that the portion corresponds to a beginning of life (BOL) to determine that a third condition 430 is met. In such cases, the media operations manager 122 retrieves a third adjustment factor 432 associated with the third condition 430. The media operations manager 122 can then retrieve the read level offset stored in the boundary WL offset table 230 for the individual WL and/or for the level of the TLC being read and multiply or modify the retrieved read level offset by the third adjustment factor 432 (e.g., 50% or half). The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

The media operations manager 122 can determine that the PEC value is between the first threshold and a second threshold. In such cases, the media operations manager 122 determines that the portion corresponds to a middle of life (MOL) to determine that a fourth condition 440 is met. In such cases, the media operations manager 122 retrieves a fourth adjustment factor 442 associated with the fourth condition 440. The media operations manager 122 can then retrieve the read level offset stored in the boundary WL offset table 230 for the individual WL and/or for the level of the TLC being read and multiply or modify the retrieved read level offset by the fourth adjustment factor 442 (e.g., 50% or half). The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

The media operations manager 122 can determine that the PEC value is above the second threshold. In such cases, the media operations manager 122 determines that the portion corresponds to an end of life (EOL) to determine that a fifth condition 450 is met. In such cases, the media operations manager 122 retrieves a fifth adjustment factor 452 associated with the fifth condition 450. The media operations manager 122 can then retrieve the read level offset stored in the boundary WL offset table 230 for the individual WL and/or for the level of the TLC being read and multiply or modify the retrieved read level offset by the fifth adjustment factor 452 (e.g., 50% or half). The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

In some examples, the media operations manager 122 can compute a temperature value for the memory sub-system 110. The media operations manager 122 can determine that the temperature value is below a first temperature threshold.

In such cases, the media operations manager 122 determines that a sixth condition 460 is met. In such cases, the media operations manager 122 retrieves a sixth adjustment factor 462 associated with the sixth condition 460. The media operations manager 122 can then retrieve the read level offset stored in the boundary WL offset table 230 for the individual WL and/or for the level of the TLC being read and multiply or modify the retrieved read level offset by the sixth adjustment factor 462 (e.g., 50% or half). The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

The media operations manager 122 can determine that the temperature value is between the first temperature threshold and a second temperature threshold. In such cases, the media operations manager 122 determine that a seventh condition 470 is met. In such cases, the media operations manager 122 retrieves a seventh adjustment factor 472 associated with the seventh condition 470. The media operations manager 122 can then retrieve the read level offset stored in the boundary WL offset table 230 for the individual WL and/or for the level of the TLC being read and multiply or modify the retrieved read level offset by the seventh adjustment factor 472 (e.g., 50% or half). The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

The media operations manager 122 can determine that the temperature value is above the second temperature threshold. In such cases, the media operations manager 122 determines that an eighth condition 480 is met. In such cases, the media operations manager 122 retrieves an eighth adjustment factor 482 associated with the eighth condition 480. The media operations manager 122 can then retrieve the read level offset stored in the boundary WL offset table 230 for the individual WL and/or for the level of the TLC being read and multiply or modify the retrieved read level offset by the eighth adjustment factor 482 (e.g., 50% or half). The media operations manager 122 can then combine or add that modified read level offset by the read level offset stored for the individual WL in the inner WL offset table 220. The media operations manager 122 can then adjust a read threshold voltage by the combined read level offset to read data stored in the individual WL (e.g., the boundary WL).

The first adjustment factor 422, second adjustment factor 424, third adjustment factor 432, fourth adjustment factor 442, fifth adjustment factor 452, sixth adjustment factor 462, seventh adjustment factor 472, and the eighth adjustment factor 482 can be the same or different values.

FIG. 5 is a flow diagram of an example method 500 (or process) to selectively perform an extrinsic defect scan operation on memory components, in accordance with some examples. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 500 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every examples. Other process flows are possible.

Referring now to FIG. 5, the method (or process) 500 begins at operation 505, with a media operations manager 122 of FIG. 1 of a memory sub-system (e.g., memory sub-system 110 of FIG. 1) generating a request to read a portion of a set of memory components 112A to 112N. Then, at operation 510, the media operations manager 122 of the memory sub-system, in response to determining that the portion corresponds to a PB, selectively modifies a boundary WL read level offset, stored in a boundary WL offset table, by applying an adjustment factor to the boundary WL read level offset. Thereafter, at operation 515, the media operations manager 122 reads a first set of data from one or more inner WLs of the portion using a first read level offset retrieved from an inner WL offset table and, at operation 520, reads a second set of data from a boundary WL of the portion using the selectively modified boundary WL read level offset.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: generating a request to read a portion of the set of memory components; in response to determining that the portion corresponds to a partially programmed block (PB), selectively modifying a boundary word line (WL) read level offset, stored in a boundary WL offset table, by applying an adjustment factor to the boundary WL read level offset; reading a first set of data from one or more inner WLs of the portion using a first read level offset retrieved from an inner WL offset table; and reading a second set of data from a boundary WL of the portion using the selectively modified boundary WL read level offset.

Example 2. The system of Example 1, the operations comprising: storing the inner WL offset table and the boundary WL offset table, the boundary WL offset table representing a set of read level offsets for reading data from an individual WL of a PB comprising a last programmed set of data.

Example 3. The system of Example 2, the operations comprising: obtaining the boundary WL read level offset from the boundary WL offset table; modifying the boundary WL read level offset by the adjustment factor; and combining the modified boundary WL read level offset with the first read level offset to generate a second read level offset.

Example 4. The system of Example 3, the operations comprising reading the second set of data using the second read level offset.

Example 5. The system of any one of Examples 3-4, the operations comprising adding the first read level offset and the modified boundary WL read level offset to generate the second read level offset.

Example 6. The system of Example 5, the operations comprising: retrieving a read threshold voltage for reading data from the portion; modifying the read threshold voltage by the first read level offset to read the first set of data; and modifying the read threshold voltage by the second read level offset to read the second set of data.

Example 7. The system of any one of Examples 3-6, wherein the inner WL offset table associates a first WL group (WLG) with a first set of read level offsets corresponding to different levels of tri-level cell (TLC) storage, wherein the inner WL offset table associates a second WLG with a second set of read level offsets corresponding to the different levels of the TLC storage, wherein the boundary WL offset table associates the first WLG with a third set of read level offsets corresponding to the different levels of the TLC storage, and wherein the boundary WL offset table associates the second WLG with a fourth set of read level offsets corresponding to the different levels of the TLC storage.

Example 8. The system of any one of Examples 3-7, the operations comprising: maintaining a buffer that identifies which region of the set of memory components has been programmed last; determining that the portion comprises the region of the set of memory components that has been programmed last; and determining that the portion corresponds to the PB in response to determining that the portion comprises the region of the set of memory components that has been programmed last.

Example 9. The system of Example 8, the operations comprising: determining that the boundary WL of the portion corresponds to the region of the set of memory components maintained in the buffer; and in response to determining that the boundary WL of the portion corresponds to the region of the set of memory components maintained in the buffer, reading the second set of data from the boundary WL of the portion using the selectively modified boundary WL read level offset.

Example 10. The system of Example 9, wherein an additional set of data has been programmed more recently than the second set of data prior to the buffer being updated to identify an individual region comprising the additional set of data, and wherein the second set of data is read from the boundary WL of the portion using the selectively modified boundary WL read level offset in response to the additional set of data being programmed prior to the buffer being updated to identify the individual region comprising the additional set of data.

Example 11. The system of any one of Examples 1-10, wherein the adjustment factor comprises a value of at least one of one quarter, one half, one third, two thirds, or three quarters.

Example 12. The system of any one of Examples 1-11, the operations comprising: storing a plurality of adjustment factors each associated with a different set of conditions; and selecting the adjustment factor from the plurality of adjustment factors based on a current condition of the set of memory components.

Example 13. The system of Example 12, the operations comprising: determining that a program erase count (PEC) associated with the set of memory components corresponds to a beginning of life (BOL) period; and in response to determining that the PEC associated with the set of memory components corresponds to the BOL period, selecting a first adjustment factor from the plurality of adjustment factors, the first adjustment factor being associated with a BOL condition in the set of conditions.

Example 14. The system of Example 13, the operations comprising: determining that the PEC associated with the set of memory components corresponds to a middle of life (MOL) period; and in response to determining that the PEC associated with the set of memory components corresponds to the MOL period, selecting a second adjustment factor from the plurality of adjustment factors, the second adjustment factor being associated with a MOL condition in the set of conditions.

Example 15. The system of any one of Examples 13-14, the operations comprising: determining that the PEC associated with the set of memory components corresponds to an end of life (EOL) period; and in response to determining that the PEC associated with the set of memory components corresponds to the EOL period, selecting a third adjustment factor from the plurality of adjustment factors, the third adjustment factor being associated with a EOL condition in the set of conditions.

Example 16. The system of any one of Examples 12-15, the operations comprising: measuring slow charge loss (SCL) associated with the portion of the set of memory components; and in response to determining that the SCL associated with the portion of the set of memory components fails to transgress a threshold value, selecting a first adjustment factor from the plurality of adjustment factors, the first adjustment factor being associated with a first SCL condition in the set of conditions.

Example 17. The system of Example 16, the operations comprising: in response to determining that the SCL associated with the portion of the set of memory components transgresses the threshold value, selecting a second adjustment factor from the plurality of adjustment factors, the second adjustment factor being associated with a second SCL condition in the set of conditions.

Example 18. The system of any one of Examples 12-17, the operations comprising: measuring temperature associated with the set of memory components; and selecting a first adjustment factor from the plurality of adjustment factors based on the measured temperature, the first adjustment factor being associated with a first temperature condition in the set of conditions comprising a first range of temperatures, a second adjustment factor being associated with a second temperature condition in the set of conditions comprising a second range of temperatures, and a third adjustment factor being associated with a third temperature condition in the set of conditions comprising a third range of temperatures.

Methods and computer-readable storage medium with instructions for performing any one of the above Examples.

Figure 6:
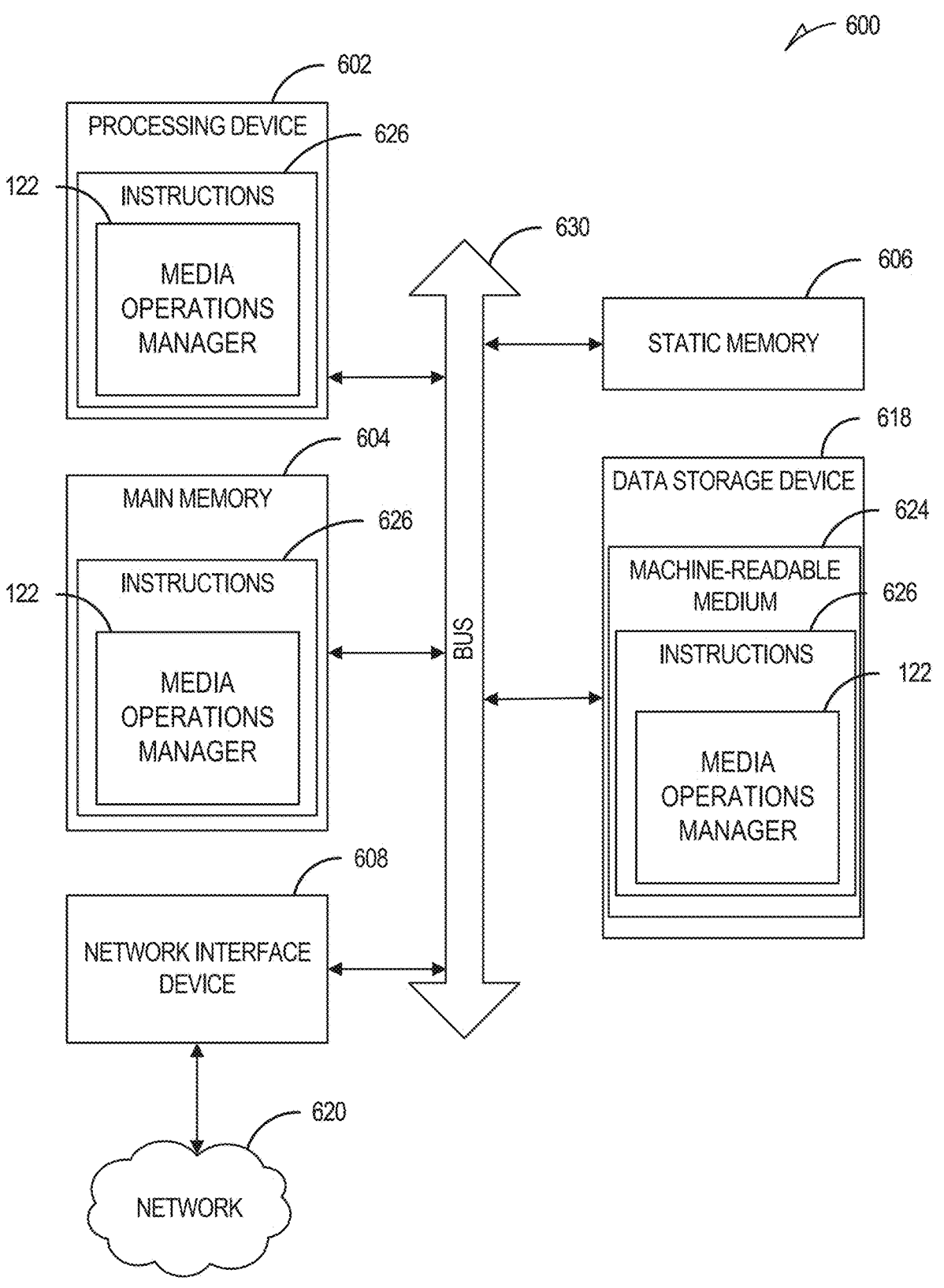
FIG. 6 is a block diagram illustrating a diagrammatic representation of a machine in the form of a computer system within which a set of instructions can be executed for causing the machine to perform any one or more of the methodologies discussed herein, in accordance with some examples.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage device 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 can correspond to the memory sub-system 110 of FIG. 1.

In one embodiment, the instructions 626 implement functionality corresponding to the media operations manager 122 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, various examples of the disclosure have been described. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
a set of memory components of a memory sub-system; and
at least one processing device operatively coupled to the set of memory components, the at least one processing device being configured to perform operations comprising:
generating a request to read a portion of the set of memory components;
in response to determining that the portion corresponds to a partially programmed block (PB), selectively modifying a boundary word line (WL) read level offset, stored in a boundary WL offset table, by applying an adjustment factor to the boundary WL read level offset;
reading a first set of data from one or more inner WLs of the portion using a first read level offset retrieved from an inner WL offset table;
combining the selectively modified boundary WL read level offset with the first read level offset to generate a second read level offset; and
reading a second set of data from a boundary WL of the portion using the second read level offset.

2. The system of claim 1, the operations comprising:
storing the inner WL offset table and the boundary WL offset table, the boundary WL offset table representing a set of read level offsets for reading data from an individual WL of a PB comprising a last programmed set of data.

3. The system of claim 2, the operations comprising:
obtaining the boundary WL read level offset from the boundary WL offset table; and
modifying the boundary WL read level offset by the adjustment factor.

4. The system of claim 3, the operations comprising adding the first read level offset and the modified boundary WL read level offset to generate the second read level offset.

5. The system of claim 4, the operations comprising:
retrieving a read threshold voltage for reading data from the portion;
modifying the read threshold voltage by the first read level offset to read the first set of data; and
modifying the read threshold voltage by the second read level offset to read the second set of data.

6. The system of claim 3, wherein the inner WL offset table associates a first WL group (WLG) with a first set of read level offsets corresponding to different levels of tri-level cell (TLC) storage, wherein the inner WL offset table associates a second WLG with a second set of read level offsets corresponding to the different levels of the TLC storage, wherein the boundary WL offset table associates the first WLG with a third set of read level offsets corresponding to the different levels of the TLC storage, and wherein the boundary WL offset table associates the second WLG with a fourth set of read level offsets corresponding to the different levels of the TLC storage.

7. The system of claim 3, the operations comprising:
maintaining a buffer that identifies which region of the set of memory components has been programmed last;
determining that the portion comprises the region of the set of memory components that has been programmed last; and
determining that the portion corresponds to the PB in response to determining that the portion comprises the region of the set of memory components that has been programmed last.

8. The system of claim 7, the operations comprising:

determining that the boundary WL of the portion corresponds to the region of the set of memory components maintained in the buffer; and in response to determining that the boundary WL of the portion corresponds to the region of the set of memory components maintained in the buffer, reading the second set of data from the boundary WL of the portion using the selectively modified boundary WL read level offset.

9. The system of claim 8, wherein an additional set of data has been programmed more recently than the second set of data prior to the buffer being updated to identify an individual region comprising the additional set of data, and wherein the second set of data is read from the boundary WL of the portion using the selectively modified boundary WL read level offset in response to the additional set of data being programmed prior to the buffer being updated to identify the individual region comprising the additional set of data.

10. The system of claim 1, wherein the adjustment factor comprises a value of at least one of one quarter, one third, two thirds, one half, or three quarters.

11. The system of claim 1, the operations comprising:

storing a plurality of adjustment factors each associated with a different set of conditions; and selecting the adjustment factor from the plurality of adjustment factors based on a current condition of the set of memory components.

12. The system of claim 11, the operations comprising:

determining that a program erase count (PEC) associated with the set of memory components corresponds to a beginning of life (BOL) period; and in response to determining that the PEC associated with the set of memory components corresponds to the BOL period, selecting a first adjustment factor from the plurality of adjustment factors, the first adjustment factor being associated with a BOL condition in the set of conditions.

13. The system of claim 12, the operations comprising:

determining that the PEC associated with the set of memory components corresponds to a middle of life (MOL) period; and in response to determining that the PEC associated with the set of memory components corresponds to the MOL period, selecting a second adjustment factor from the plurality of adjustment factors, the second adjustment factor being associated with a MOL condition in the set of conditions.

14. The system of claim 12, the operations comprising:

determining that the PEC associated with the set of memory components corresponds to an end of life (EOL) period; and in response to determining that the PEC associated with the set of memory components corresponds to the EOL period, selecting a third adjustment factor from the plurality of adjustment factors, the third adjustment factor being associated with a EOL condition in the set of conditions.

15. The system of claim 11, the operations comprising:

measuring slow charge loss (SCL) associated with the portion of the set of memory components; and in response to determining that the SCL associated with the portion of the set of memory components fails to transgress a threshold value, selecting a first adjustment factor from the plurality of adjustment factors, the first adjustment factor being associated with a first SCL condition in the set of conditions.

16. The system of claim 15, the operations comprising:

in response to determining that the SCL associated with the portion of the set of memory components transgresses the threshold value, selecting a second adjustment factor from the plurality of adjustment factors, the second adjustment factor being associated with a second SCL condition in the set of conditions.

17. The system of claim 11, the operations comprising:

measuring temperature associated with the set of memory components; and selecting a first adjustment factor from the plurality of adjustment factors based on the measured temperature, the first adjustment factor being associated with a first temperature condition in the set of conditions comprising a first range of temperatures, a second adjustment factor being associated with a second temperature condition in the set of conditions comprising a second range of temperatures, and a third adjustment factor being associated with a third temperature condition in the set of conditions comprising a third range of temperatures.

18. A method comprising:

generating a request to read a portion of a set of memory components;

in response to determining that the portion corresponds to a partially programmed block (PB), selectively modifying a boundary word line (WL) read level offset, stored in a boundary WL offset table, by applying an adjustment factor to the boundary WL read level offset;

reading a first set of data from one or more inner WLs of the portion using a first read level offset retrieved from an inner WL offset table;

combining the selectively modified boundary WL read level offset with the first read level offset to generate a second read level offset; and reading a second set of data from a boundary WL of the portion using the second read level offset.

19. The method of claim 18, further comprising:

obtaining the boundary WL read level offset from the boundary WL offset table; and modifying the boundary WL read level offset by the adjustment factor.

20. A non-transitory computer-readable storage medium comprising instructions that, when executed by at least one processing device, cause the at least one processing device to perform operations comprising:

generating a request to read a portion of a set of memory components;

in response to determining that the portion corresponds to a partially programmed block (PB), selectively modifying a boundary word line (WL) read level offset, stored in a boundary WL offset table, by applying an adjustment factor to the boundary WL read level offset;

reading a first set of data from one or more inner WLs of the portion using a first read level offset retrieved from an inner WL offset table;

combining the selectively modified boundary WL read level offset with the first read level offset to generate a second read level offset; and reading a second set of data from a boundary WL of the portion using the second read level offset.

* * * * *